United States Patent [19]

Platt, Jr.

[11] 4,402,099

[45] Sep. 6, 1983

[54] BEEHIVE FOR IMPROVED BEEKEEPING IN TROPICAL COUNTRIES

[75] Inventor: James L. Platt, Jr., Novato, Calif.

[73] Assignee: Chevron Research, San Francisco, Calif.

[21] Appl. No.: 259,897

[22] Filed: May 4, 1981

[51] Int. Cl.³ ............................................. A01K 47/00
[52] U.S. Cl. ......................................................... 6/1
[58] Field of Search .................................. 6/1, 2 R, 10

[56] References Cited

U.S. PATENT DOCUMENTS

| | | | |
|---|---|---|---|
| 463,674 | 11/1891 | Ackley | 6/1 |
| 1,441,524 | 1/1923 | Platten | 6/2 R |
| 2,162,413 | 6/1939 | Wisniewski | 6/2 R |
| 2,340,219 | 1/1944 | Hawkins | 6/2 R |
| 3,968,531 | 7/1976 | Cartwright | 6/1 |

FOREIGN PATENT DOCUMENTS

| | | | |
|---|---|---|---|
| 2302332 | 7/1974 | Fed. Rep. of Germany | 6/1 |
| 989411 | 9/1951 | France | 6/2 R |
| 668625 | 3/1952 | United Kingdom | 6/2 R |

*Primary Examiner*—Robert P. Swiatek
*Attorney, Agent, or Firm*—Burns, Doane, Swecker & Mathis

[57] ABSTRACT

A beehive for use in tropical environments is disclosed to be fabricated from plastic such as plastic foam and to have an elongated horizontal shape with a plurality of removable top cover/access plates and a bee entrance portal placed at a bottom corner of one of its elongated sides.

12 Claims, 5 Drawing Figures

BEEHIVE FOR IMPROVED BEEKEEPING IN TROPICAL COUNTRIES

BACKGROUND OF THE INVENTION

1. Field of the Invention

This invention relates to beehives and more particularly to beehives for use in tropical countries, which hives are fabricated from plastic materials.

2. Description of Prior Art

In developed Western countries, a relatively complicated type of beehive known as Langstroth hive has been the hive of choice. This is a "multi-story" device as shown in FIG. 1 to include a hive stand 11 which rests on the ground, bottom board 12, one or more hive bodies 14, in which are suspended a plurality of frames 15. Body 14 and frames 15 generally serve as a brood chamber for the hive. Above body 14 are stacked one or more hive bodies, also called "supers," 16 and 17 in which are arranged movable frames 19 and 20. The hive is topped by cover 21. An optical queen excluder 22 is generally positioned between body 14 and supers 16 and 17. The supers are provided to facilitate the storage of excess honey by the bees and its concomitant collection by the beekeeper. In such a hive, the various stories may be lifted off, substituted for and the like. A range of variations of this style have been prepared such as, for example, in West German O.L.S. No. 2,302,332.

This hive configuration generally works very well with the various species of bees prevalent in Europe and the U.S.A. These types of bees are relatively docile and will tolerate the interference that results from the lifting off and movement of the various hive "stories."

In tropical countries, the Langstroth hive has not been widely successful. For many of the less developed emerging societies, the Langstroth hive is too complicated and costly for widespread use. In addition, many tropical bee species are too aggressive for use in this type hive. They will not tolerate substantial interference with their hives—attacking the beekeeper, or abandoning the hive when the hive is opened. Other problems with the Langstroth hive when used in the tropics include its ground placement which permits attacks by insects such as safari ants who are capable of laying waste to entire groups of hives overnight and animals such as honey badgers, as well as ready devastation by grass fires. Additionally, its geometry has been arrived at to favor honey production at the expense of the production of beeswax—a material which has a good market in many tropical countries. Yet another disadvantage of Western hives is their usual material of construction—wood. In tropical environments, insects, fungi, etc. attack the wood and rapidly destroy the hive.

An excellent review of the beekeeping methodologies being pursued in tropical countries is presented by G. F. Townsend in his paper "Transitional Hives for Use with the Tropical African Bee Apis Mellifera Adonsonii" appearing in the text *Apiculture in Tropical Climates* (1976), pages 181-189. Townsend points out many of the above-noted failings of Western hives when used in the Tropics. Townsend reviews the hollow log hives, Kenya top-bar hives, and African long hives now being employed. These hives are generally elongate in design with a bee entrance at their end and often with a single removable lid. Historically, they have been fabricated of wood with its attendant disadvantages.

The hives of the present invention are fabricated from plastic. Plastic is known as a material of construction for Langstroth type hives as shown in U.S. Pat. Nos. 3,968,531, 4,199,832 and the like.

STATEMENT OF THE INVENTION

The present invention provides a beehive particularly adapted for use with tropical bees in tropical environments such as Central and South America, Africa, and the Far East. The hive is generally characterized as a single story "long" hive, as being fabricated of plastic and as being adapted for use in a hanging configuration. The hive has an elongated openable-topped configuration derived from an open-topped hive body formed of a rectangular elongate base, elongate front and back panels and two end panels. The end parcels may be both rectangular or both trapezoidal. These panels are fixably attached to the base or are cast with the base as a unit. The front panel contains a bee entrance/exit portal at either one of its lower corners. The hive body has means such as cleats for suspending the hive. The front and back panels each have a longitudinal notch on their top inside edge. A plurality of plastic or wood comb frames or top bars span the front and rear panels suspended from the notches such that the tops of the frames or bars are below the top of the panels. An optional queen excluder can be placed on the hive as well. This is suspended from the notches at any point between the end panels as determined by the beekeeper. This queen excluder extends up to the top of the panels but not above them. A plurality of individually removable rectangular plastic closing panels span and cover the top of the hive body. These closing panels have end flanges that frictionally engage with and lock to the front and back panels. In place, the closing panels engage one another to form a water-excluding continuous cover.

This plastic hive construction is light weight and not subject to insect or microbial attack. This plastic construction eliminates time consuming routine maintenance such as painting and caulking. Its long hive geometry is proven effective in tropical apiculture and, I have found, reduces the tendency for colonies to swarm, possibly due to decreased brood chamber congestion. Its separately removable segmented top cover permits the hive to be serviced with minimal interference with the bees resident therein. Its off-the-ground placement by suspension further reduces hive damage by insects, animals or fire.

BRIEF DESCRIPTION OF THE DRAWING

In the description of the preferred embodiment that follows, reference will be made to the accompanying drawings in which.

DESCRIPTION OF THE PREFERRED EMBODIMENT

Figure 2:
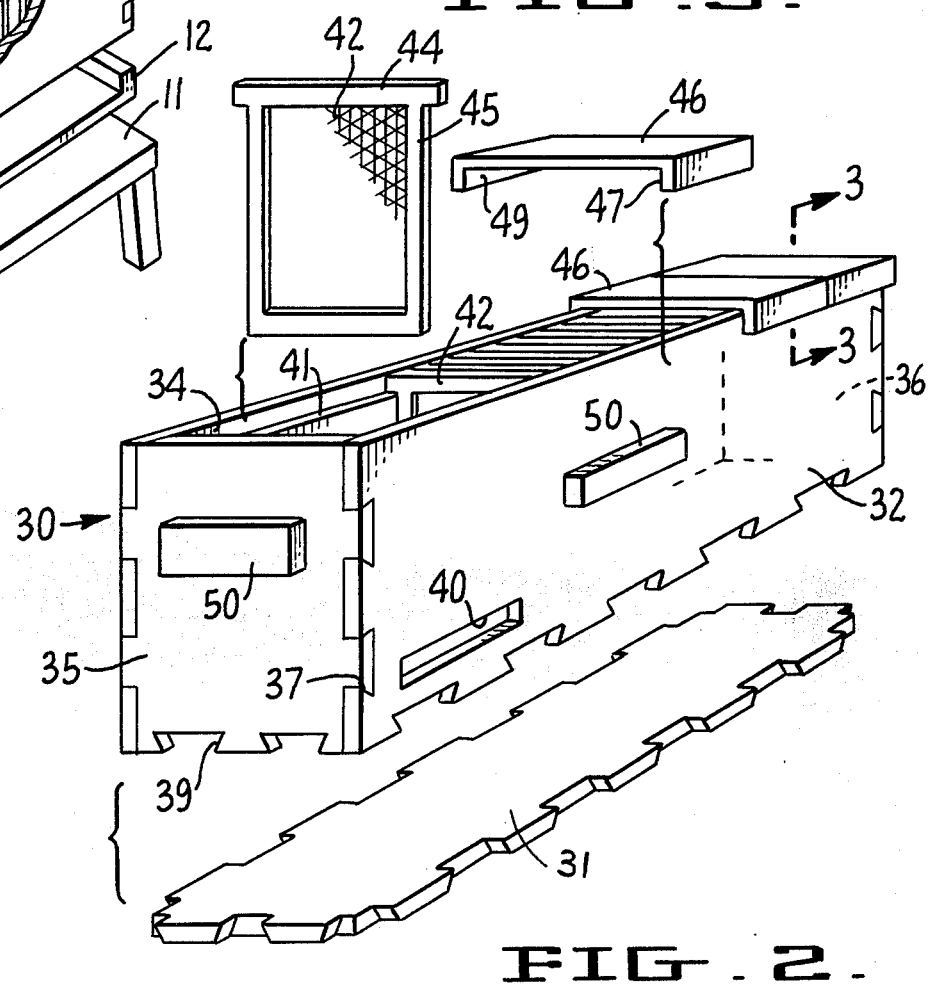
FIG. 2 is an exploded pictorial view of one type of hive of this invention.
Figure 4:
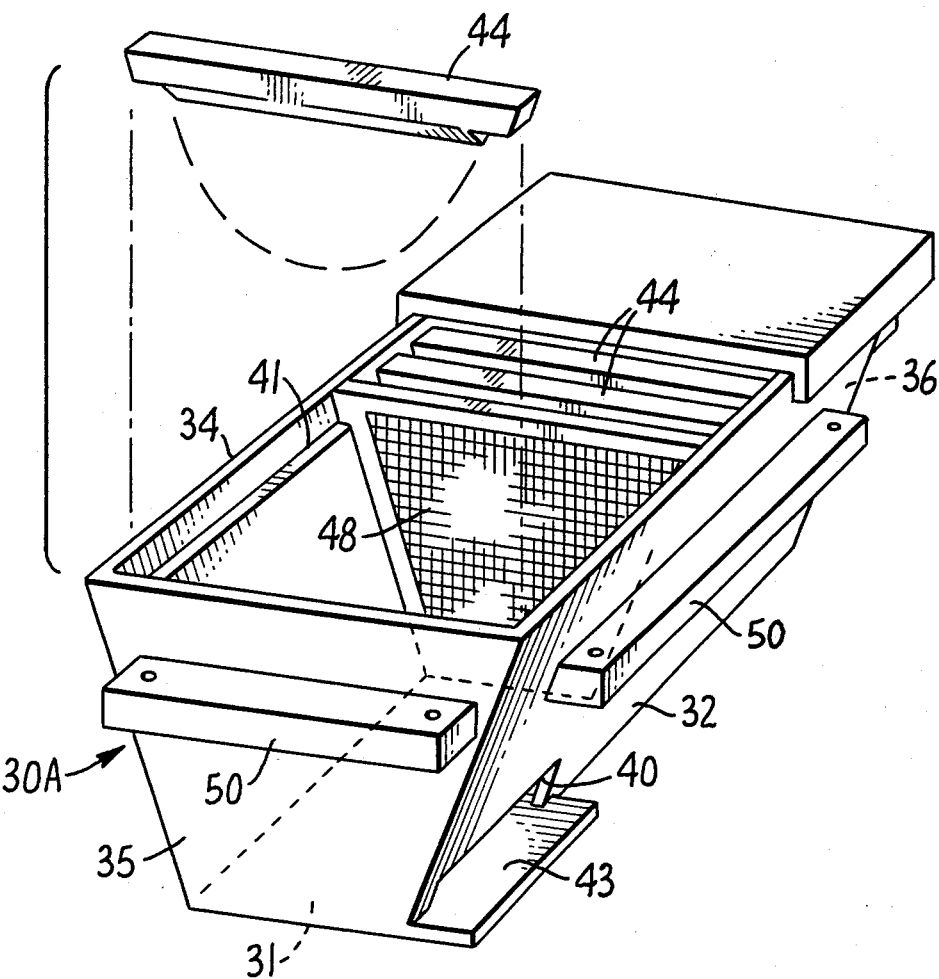
FIG. 4 is an exploded pictorial view of another embodiment of the hive of this invention.

As may be seen in FIG. 2, one alternative configuration of the beehive of this invention 30 includes a base 31 having affixed thereto rectangular elongated front panel 32 and rectangular elongated back panel 34. In this configuration, these panels are parallel to one another. At their ends are positional rectangular end panels 35 and 36. The end panels and front and rear panels are joined together and attached to base 31 to form an open-topped hive body. This joining can be effected in a number of ways. For one, the various panels can be cast together as a unit body. For another, they can be glued or otherwise chemically or heat bonded. For another, they may be joined with nails or screws or like fixtures. For yet another, and as shown, the panels may be latched together using notches on their periphery such as notches 37 and 39. These notches can be tapered and, with the plastic construction of the panels, can be sized to compressively engage and lock one another. This mode of construction permits the hive to be transported in a knocked-down form and assembled in the field, if desired. Front panel 32 carries an entrance/exit portal 40. This portal is located at a lower corner of the panel. This configuration is advantageous as the bees enter and exit the hive parallel to the planes of the interior comb frames. This is a preferred direction of entrance as opposed to entrance perpendicular to the frames. Front and rear panels 32 and 34 each carries a longitudinal notch 41 in its top inner surface. These notches are about an inch deep. A plurality of comb frames 42 are set inside the hive body. Frame 42 has a top bar 44 and a lower section 45 and, as is known in the art, is provided with a beeswax matrix for the bees to construct their combs on. These frames are spaced about a cm apart with a free space of 2–4 cm or so below. Top bar 44 extends beyond both sides of frame 42. These extensions fit into notches 41 and permit the frames to be suspended therefrom in the hive body. The depth of notches 41 is at least equal to the height of top bar 44 so that in place, frame 42 is entirely below the plane defined by the tops of panels 32, 34, 35 and 36. Optionally, as shown in FIG. 4, a queen excluder is present as well. The open top is covered in use, so that the hive is enclosed. This covering is accomplished by a plurality of covering panels 46. These panels 46 are rectangular and span panels 32 and 34. Panels 46 have downward facing flanges 47 and 49 on their ends. These latch over and engage panels 32 and 34 when the panels 46 are in place. The panels have joining means such as tongue and grooving to enable them to join together into a rain resistant unit top when in place. The number of top closing panels is between 2 and about 10. This enables a limited portion of the hive to be opened for service without requiring disturbance of the entire hive.

Hive 30 is shown equipped with cleats 50. These are representative of means for attaching or mounting the hive. Generally such mounting is effected by suspending or rigging the hive off the ground to minimize insect or animal attack.

Figure 1:
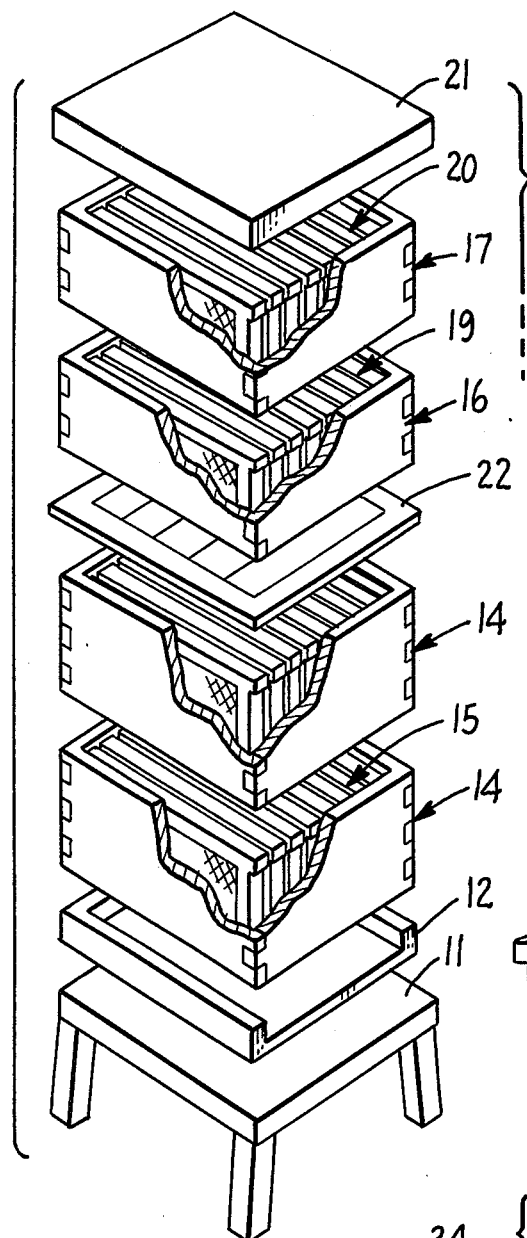
FIG. 1 has already been referred to in the background of the invention.
Figure 3:
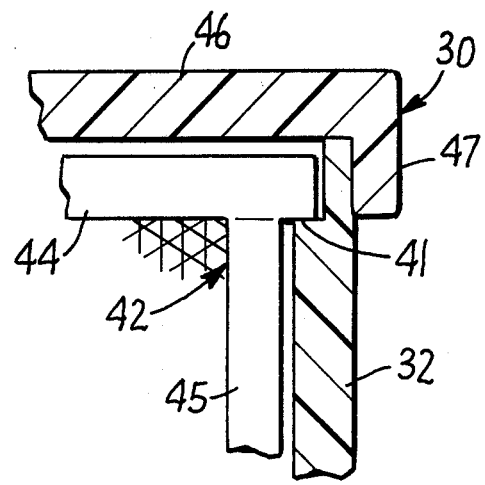
FIG. 3 is a cut away end view of a hive of FIG. 2.

Turning to FIG. 3, a corner of hive 30 is shown with front panel 32 carrying notch 41, in engagement with top closure panel 46. Flange 47 extends down and seals the joint between closure panel 46 and panel 32. Comb frame 42 made up of top bar 44 and lower member 45 rests in notch 41. As shown, the depth of notch 41 is such that top bar 44 fits below the plane of the top of the hive body wall panels. This enables removable closure panel 46 to fit down tight on the top of the hive body.

Turning to FIG. 4, another embodiment of the beehive of this invention, hive 30A, is shown. Without intention of limiting the scope of this invention, but merely to better illustrate the usual scale of a hive of this invention, approximate dimensions will be given for this embodiment. Hive 30A comprises an elongated rectangular base 31 about 20–24 cm wide and about 80–90 cm long to which are affixed elongated rectangular front and back panels 32 and 34. These panels are about 80–90 cm long and about 25–30 cm high. At their ends are trapezoidal end panels 35 and 36. These panels are about 18–24 cm wide at their bottom and about 48–60 cm wide at their top. The base and four side panels are joined together to form an open-topped hive body of trapezoidal cross-section. Front panel 32 carries an entrance-exit portal 40, equipped with landing board 43 at one of its lower corners. Front and rear panels 32 and 34 each carries a longitudinal notch 41 in its top inner surface to about 1–2 cm below the top inner surface. A plurality of comb top bars 44 are set inside the hive body bridging front and back notches 41. These top bars are wood or plastic and have a beeswax coating on their bottom surface and provide comb attachment sites. It should be noted that with tropical bees, the use of top bars is generally preferred to that of the functionally equivalent comb frames. Top bars 44 are sized to span between panels 32 and 34. They rest on and are suspended from notches 41 and are spaced about 0.5–1.0 cm apart. Top bars 44 do not extend into the plane defined by the tops of panels 32, 34, 35 and 36. A queen excluder 48 is optionally positioned in between two of the top bars at a spot selected by the beekeeper. Queen excluder 48 is fabricated by a screen or mesh that is too small to permit the queen or drones to pass through but which permits workers to pass. Queen excluder 48 is of a size and trapezoidal shape to seal to the top closure panel, front and back panels and bottom panel. Top closure panels 46 and mounting cleats 50 are provided as set forth with reference to FIG. 2. This trapezoidal geometry is preferable for two reasons. First, tropical bees seem to prefer it. They are more willing to construct their combs on the top bars and less prone to form combs on the side walls with this geometry. Second, it permits the hive bottom and front and back walls to be formed and nested as a single unit. This increases shipping efficiency.

Figure 5:
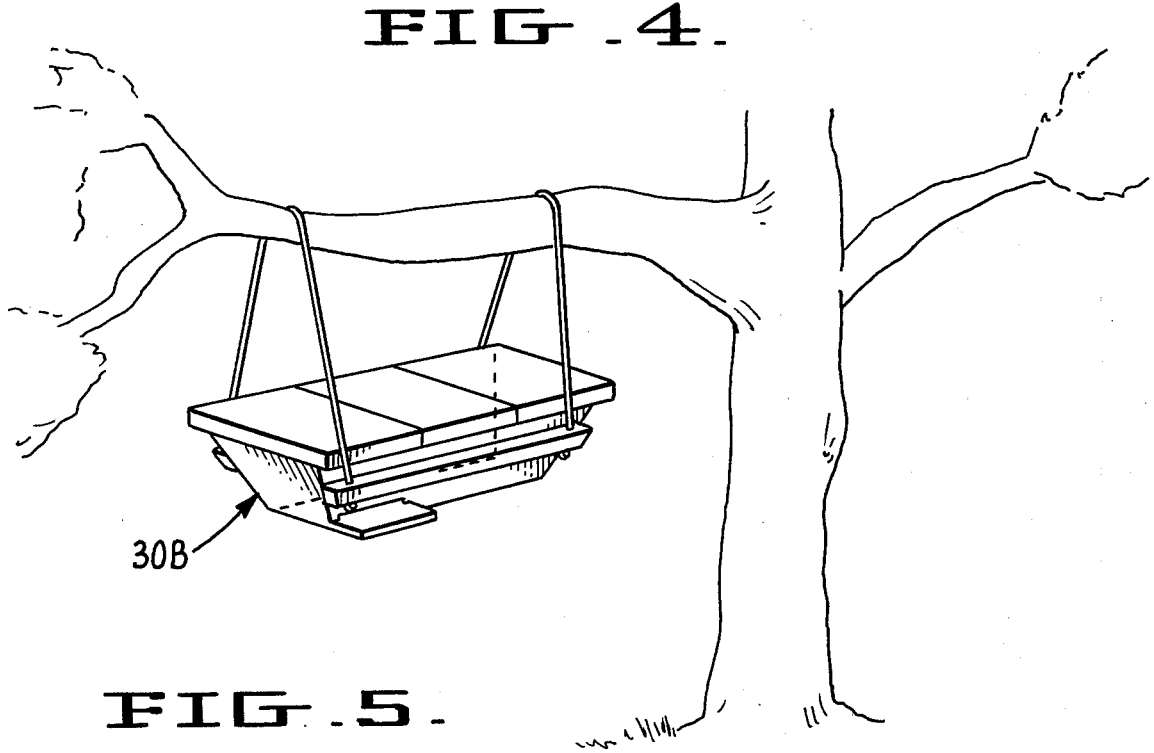
FIG. 5 is an exploded pictorial view of a third embodiment of the hive of this invention.

Turning to FIG. 5, a third embodiment of the plastic elongated hive of this invention is shown. In this embodiment the front and back panels are trapezoidal as well as the end panels. This hive, 30B, has the same panels and same general arrangement as do hives 30 and 30A with the exception of the just-noted change in geometry. This geometry offers the advantage of being nestable for shipment when cleats 50 and landing board 43 are removed.

As already noted, the hive of this invention is built of plastic. The term "plastic" as used herein, includes foamed plastic, plastic laminates and the like. Such materials include simple poly(urethane) foams, poly(olefin) foams, poly(styrene) and styrene copolymer foams and, in addition, anisotropic skinned plastic foams such as skinned poly(urethane) and plastic foam containing laminates. Other plastic laminates, such as corrugated plastic sheathed with plastic sheet, may also be employed. These materials are all well known to the art and do not per se constitute the invention claimed herein.

Although the plastic employed may be selected from a wide range of materials known the the art, the following selection criteria advantageously are employed:

Overall Density: 5 to 50 pounds per cubic foot. Foams of such densities are light in weight for transport, good insulators (thereby maintaining hive internal temperature at a desired constant level), and structurally strong. Lower density foams, such as those having densities of less than 5 pounds per cubic foot, themselves lack adequate strength. Such materials generally require some form of reinforcement either internally or as a laminate or formed skin.

Strength and Durability: The plastics employed should be selected to provide structural strength and good durability as the hives can weigh as much as 50 kg. or more in use and are to be in use for several years in tropical conditions without replacement. A simple poly(styrene) foam, for example, generally is not strong enough and durable enough to meet these requirements. Laminates having rigid or semirigid skins and a foam or corrugated plastic core, while more expensive than simple foams, provide the desired strength and durability.

U.V. Stability: The foams, or at least their outer surfaces, should be stable to ultraviolet radiation. Polyvinyl chloride, methylmethacrylate and polycarbonate are plastics known to have superior U.V. stability. Paints or other surface coatings could be employed to provide desired stability, but it is preferred to minimize maintenance by using UV-stable plastic.

Absence of Offensive Volatile Components: Clearly, a plastic containing large amounts of entrained volatile plastisizers such as alcohols, release agents, catalysts such as volatile amines, solvents or unreacted monomers. If these materials are lethal or repugnant to bees, they cannot be used unless the plastic is sealed to prevent their release. Similarly, plastics that release materials which contaminate honey are not desirable. Therefore, as a rule, it is desired to avoid plastics capable of releasing these materials, or the like.

Without intending to limit the scope of this invention, the following plastics give good results: Semirigid Poly(vinylchloride) or poly(acrylonitrile-butadiene-styrene) sheets or skins laminated over polyurethane or polystyrene foams or poly(acrylonitrile-butadiene-styrene) foams (ABS foams); poly(vinylchloride/acrylic) skins laminated over poly(urethane) or poly(styrene); ABS-skinned ABS foam; and painted poly(urethane) foam.

The several hive panels can be fabricated by molding, cutting, and like processes known to the plastic part-forming art. The several hive panels are then assembled in much the same manner as parts of a wooden hive would be assembled or by latching panels together. As previously mentioned, the base and four wall panels can be molded as a unit, if desired. After assembly, the hive is placed in service such as by suspending it from a suitable frame, tree or the like.

What is claimed is:

1. A beehive particularly adapted for suspended use with tropical bees in tropical environments comprising an elongated flat rectangular base, an elongated rectangular front panel having a bee entrance portal at a lower corner, an elongated rectangular back panel and two rectangular end panels, each of said base and said panels having complementary tapered notches along at least some of its edges for mating and engaging with those of the other panels and the base to releasably affix them to one another and form a knock-down structure which defines an open-topped hive body that can be easily assembled and disassembled in remote areas, said front and back panels each having an internal longitudinal notch along its top edge, a plurality of rectangular top closing panels sized to span between the front and back panels and having flanges on their end edges which in place frictionally engage said front and back panels, which top closing panels are individually removable and which, in place, cover the hive body open top, said base and panels being fabricated from a laminate of a poly(acrylonitrile-butadiene-styrene) sheet over poly(acrylonitrile-butadiene-styrene) foam, a plurality of removable comb foundation elements suspended from the internal longitudinal notches in the front and back panels such that the tops of the comb foundation elements are recessed from the top surfaces of said front and back panels so as not to interfere with said closing panels and oriented such that bees entering and exiting said portal move in a direction generally parallel to said comb foundation elements, and means attached to at least two opposite ones of said panels for suspending said beehive.

2. The beehive of claim 1 additionally comprising queen excluding means located between two of said plurality of comb foundation elements.

3. The beehive of claim 1 further characterized as having a length of from about 80 to 90 cm, a height of 24 to 30 cm, and a width of 48 to 60 cm.

4. The beehive of claim 3 wherein said comb foundation elements are top bars.

5. The beehive of claim 3 wherein said comb foundation elements are comb frames.

6. A beehive particularly adapted for suspended use with tropical bees in tropical environments comprising an elongated flat rectangular base having integrally molded thereto an elongated front panel having a bee entrance portal at a lower corner, an elongated back panel and two trapezoidal end panels having the smaller of the two unequal sides at the bottom thereof, to thereby define an open-topped hive body, said front and back panels each having an internal longitudinal notch along its top edge, a plurality of rectangular top closing panels sized to span between the front and back panels and having flanges on their end edges which in place frictionally engage said front and back panels, which top closing panels are individually removable and which, in place, cover the hive body open top, said base and panels being fabricated from a laminate of poly(acrylonitrile-butadiene-styrene) sheet over poly(acrylonitrile-butadiene-styrene) foam, a plurality of removable comb foundation elements suspended from the internal longitudinal notches in the front and back panels such that the tops of the comb foundation elements are recessed from the top surfaces of said front and back panels so as not to interfere with said closing panels and oriented such that bees entering and exiting said portal move in a direction generally parallel to said comb foundation elements, and means attached to at least two opposite ones of said panels for suspending said beehive.

7. The beehive of claim 6 wherein said front and back panels are rectangular.

8. The beehive of claim 7 further characterized as having a length of from about 80 to 90 cm, a height of 25 to 30 cm, a trapezoidal base width of 18 to 24 cm and a trapezoidal top width of 48 to 60 cm.

9. The beehive of claim 8 wherein said comb foundation elements are top bars.

10. The beehive of claim 6 wherein said front and back panels are equal-sized trapezoids having their small side at their base.

11. The beehive of claim 10 further characterized as having a top length of from about 80 to 90 cm, a height of 25 to 30 cm, a trapezoidal base width of 18 to 24 cm and a trapezoidal top width of 48 to 60 cm.

12. The beehive of claim 11 wherein said comb foundation elements are top bars.

* * * * *